May 15, 1928.

S. O. LOKEY 1,669,943

AMMONIA CONDENSER

Filed Nov. 6, 1926

Inventor

Stiles O. Lokey

By

Attorney

Patented May 15, 1928.

1,669,943

UNITED STATES PATENT OFFICE.

STILES O. LOKEY, OF BIRMINGHAM, ALABAMA.

AMMONIA CONDENSER.

Application filed November 6, 1926. Serial No. 146,782.

This invention has general reference to apparatus for liquefying gaseous or vaporous substances, and relates more particularly to a device of the shell-and-tube type which is especially adapted for condensing ammonia gas or vapor in refrigerating operations.

I am aware that heretofore apparatus has been devised and used in which cooling coils were placed in a closed shell, said coils having cooling water circulating therethrough, and the compressed ammonia gas or vapor being admitted to the shell through one or more ejectors by which the gas or vapor was forced upward through the condensed liquid ammonia in the lower portion of the shell; but such an arrangement has proven to be open to several objections, among which may be mentioned the extent of the pressure required to force the gas or vapor through the liquid, and the tendency of the liquid to become unduly heated unless a large volume thereof is at all times retained in the shell. By admitting the gas or vapor to the shell through injectors placed at the surface of a comparatively small volume of liquid ammonia previously condensed in the same apparatus, and cooled through the action of the injectors in projecting said liquid against suitable cooling means, I obviate both of said objections, and at the same time secure much greater condensing efficiency than has been possible heretofore, both by absorbtion and by cooling, with greatly simplified apparatus.

A primary object of the present invention is to produce a device in which ammonia gas or vapor may be liquefied by combined absorption and cooling, and in which the gas or vapor is combined with liquid ammonia previously condensed in the same apparatus, to form a spray before being subjected to the cooling action.

A further object is to produce such a device in which the ammonia gas or vapor is admitted to a closed receptacle having cooling pipes therein, through one or more injectors located at the surface of a body of liquid ammonia in the lower part of such receptacle, the level of such liquid being maintained automatically.

Another object is to provide in said receptacle closed conduits through which a cooling medium is circulated by gravity in a direction opposite that in which the spray is projected by the injectors.

And still a further object is to provide in connection with such receptacle, means for drawing off any noncondensable gases that may accumulate in any part of the receptacle, and means for removing from the receptacle any grease or oil or other foreign matter that may collect at the bottom thereof.

The means by which the foregoing and other objects are accomplished by my invention, and the manner of their accomplishment, readily will be understood from the following description on reference to the accompanying drawings, which depict a preferred embodiment of the invention, and in which :—

Figure 1:
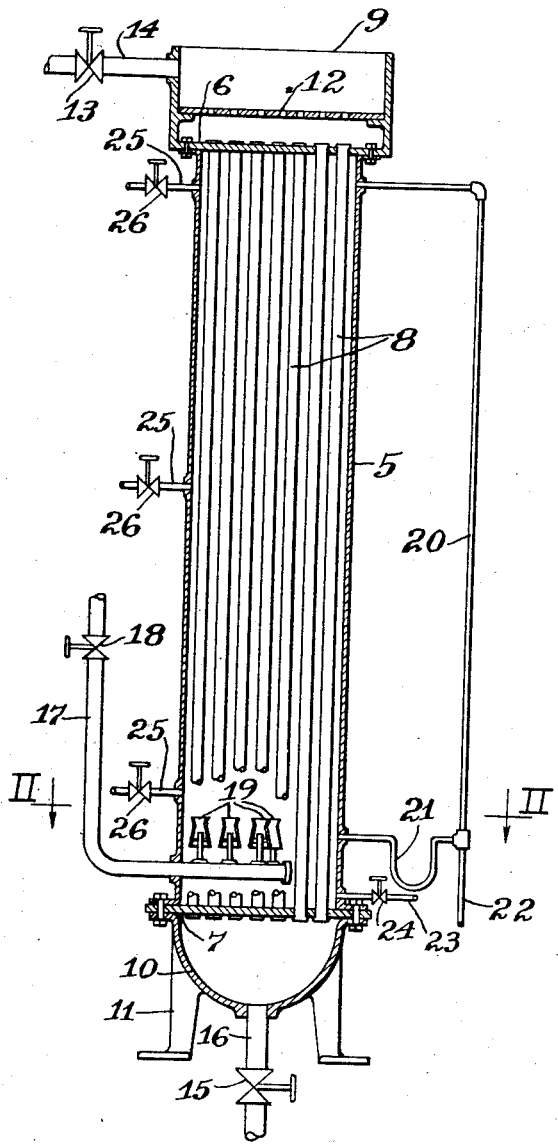
Fig. 1 is a sectional elevation substantially on the center line of the shell of the condenser, with the lower ends of some of the cooling tubes broken away.
Figure 2:
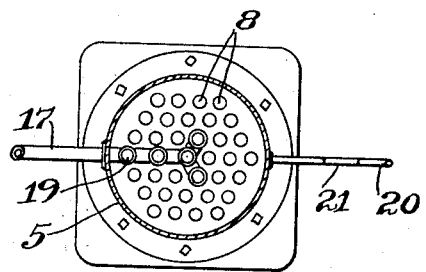
Fig. 2 is a sectional plan, the section being taken substantially an line II—II of Fig. 1.
Figure 3:
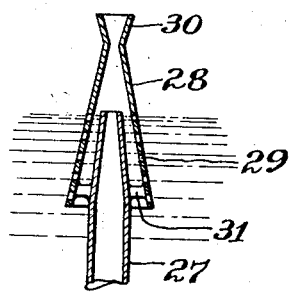
Fig. 3 is an enlarged sectional detail view of a preferred form of injector to be used in the condenser shown in the other views.

As shown in the drawings, in which similar parts are indicated by corresponding reference characters throughout the several views, the condenser comprises a closed shell 5, having suitably secured thereto, with gas-tight and liquid-tight joints, an upper head 6 and a lower head 7, into which are expanded, welded, or otherwise similarly secured, a plurality of similar tubes 8, spaced apart in substantially symmetrical arrangement, said tubes communicating at their upper ends with an open water-box 9, the bottom of which is formed by the head 6, and the sides of which may be cast unitary therewith, and at their lower ends with a substantially hemispherical casting 10, connected by a water-tight joint to the head 7 and supported upon legs 11. In the water-box 9 is placed removably a perforated plate 12 by which the water is distributed among pipes 8, and the rate of its flow down into the lower portion of the water-box, and thence to said tubes, may be regulated by the use of different distributing plates the respective ones of which have holes of different sizes therein. The rate of delivery of water to the water-box is controllable by means of a valve 13 in the water-admission pipe 14, and the rate of discharge of the water is subject to regulation by means of a valve 15 in a discharge pipe 16 at the base of the casting 10.

Ammonia gas or vapor from the compressor (not shown) is delivered to the shell of the condenser through a pipe 17, having a valve 18 therein, and provided within the shell with a plurality of upwardly-projecting injectors 19. An equalizing line 20, having a trap 21 therein, serves to maintain the level of the liquid ammonia in the shell at the desired height to insure the intended action of the injectors, the overflow of liquid ammonia that is formed as condensation takes place being discharged through a pipe 22 which is connected with said equalizing line. A pipe 23, having a valve 24 therein, provides for the removal of oil, grease or other foreign matter from the lower part of the shell 5, and a plurality of similar pipes 25, each having a valve 26 therein, provide for the escape of noncondensable gases from the shell.

Each of the injectors 19 comprises a jet nozzle 27 connected with the pipe 17, and a cone-shaped combining tube 28, having a plurality of orifices 29 in the side wall thereof, and having a flared discharge end 30. Said tube is supported from the jet nozzle 27, as by webs 31, said parts preferably being cast in one piece. The liquid level is maintained at a height slightly below the discharge end of the jet nozzles, so that a true injector action is secured.

From the foregoing description, the operation of my improved condenser readily will be understood. The injectors, acting upon the liquid ammonia at the bottom of the shell substantially at the surface thereof, inject the combined liquid and vapor upward into the shell and into contact with the cooling tubes 8, all of the ammonia gas or vapor thus being brought into intimate contact with the liquid, and the spray formed by the combined liquid and gas or vapor being moved along said tubes in a direction contrary to the direction of movement of the cooling water in the tubes 8. The gas or vapor converted into liquid by the combined absorbtion and condensation action, falls to the lower part of the shell 5, after having been thoroughly cooled, and the level is maintained by overflow through the ammonia discharge pipe 22. The rate of flow of the water through the cooling tubes 8 is so regulated that the liquid ammonia in the shell will be maintained at the temperature calculated to give the best results. Whenever the condenser is not in operation, the valves 26 may be opened to permit the escape of noncondensable gases from the shell, and the valve 24 may be opened when necessary or desirable, to discharge oil, grease or other impurities from the bottom of the shell.

Various modifications of minor details of my improved condenser doubtless readily will suggest themselves to those skilled in the art to which it appertains, but such modifications fall within the scope of my inventive rights, and the invention is not to be construed as being limited to any details not specifically set out in the claims.

Having thus fully disclosed the invention, what I claim as new, and seek to secure by Letters Patent, is:—

1. A condenser for vapors and gases, comprising a closed shell having a space in the lower portion thereof for the reception of the condensate, conduits for the circulation of a cooling medium within said shell, and an injector within the shell in position to project a mixture of the substance to be condensed and the product of such condensation in the form of spray against the exterior surfaces of said conduits.

2. A condenser conforming to claim 1, in which the condensate is a fluid, in combination with means to limit the height of the level of said fluid in the shell automatically.

3. A condenser conforming to claim 1, in which the cooling medium is circulated within the shell by gravity.

4. A condenser conforming to claim 1, in which the conduits are substantially straight, and each extends from the exterior of the top of the shell to the exterior of the bottom thereof.

5. A condenser conforming to claim 1, in which the shell has a plurality of controllable outlets at different levels to provide for the escape of noncondensable gases therefrom.

6. A condenser for vapors and gases, comprising a closed shell having a space in the lower portion thereof for the reception of fluid condensate, means for automatically limiting the height of the level of such condensate in the shell, closed conduits for the circulation of a cooling medium within the shell, and a plurality of injectors within the shell substantially at the level of the fluid condensate therein, whereby the substance to be condensed is brought into intimate contact with such fluid at the surface thereof, and a mixture of such substance and the condensate in the form of spray is projected against the exterior surfaces of said conduits.

7. A condenser conforming to claim 6, in which the spray formed by the mixture of the substance to be condensed and the condensate is projected by the injectors in a direction opposite to that in which the cooling medium circulates.

In testimony whereof I affix my signature.

STILES O. LOKEY.